United States Patent [19]

Gupta

[11] Patent Number: 4,788,719
[45] Date of Patent: Nov. 29, 1988

[54] TELEPHONE CALL CHARGE ALLOCATION ARRANGEMENT

[75] Inventor: Shiv K. Gupta, Red Bank, N.J.

[73] Assignees: American Telephone and Telegraph Company; AT & T Information Systems Inc., both of Murray Hill, N.J.

[21] Appl. No.: 119,881

[22] Filed: Nov. 13, 1987

[51] Int. Cl.$^4$ .......................................... H04M 15/16
[52] U.S. Cl. .................... 379/114; 379/130; 379/140
[58] Field of Search ............... 379/133, 114, 117, 130, 379/140, 202, 205, 206

[56] References Cited

U.S. PATENT DOCUMENTS

| | | | |
|---|---|---|---|
| 3,674,940 | 7/1972 | Leyburn et al. | 179/13 |
| 3,697,695 | 10/1972 | Pommerening et al. | 179/7 |
| 4,054,756 | 10/1977 | Comella et al. | 379/114 |
| 4,072,827 | 2/1978 | Oman | 179/42 |
| 4,382,295 | 5/1983 | Moffitt et al. | 370/68 |

OTHER PUBLICATIONS

Telecommunications, vol. 8, No. 7, Jul. 1974, "Measuring Telephone Usage", Vitel, Mountain View, CA., pp. 45-46.
Commutation & Electronique, No. 47, Oct. 1974 (France), "Ceres, Autocommutateur pour installation privee semi-automatique", C. Vie, pp. 90-107.
IBM Technical Disclosure Bulletin, vol. 24, No. 1A, Jun. 1981, "Call Charge Accounting in a PBX", A. Durand et al., p. 120.
Computerworld (USA) vol. 18, No. 27A, 4 Jul. 1984, "Keeping a Dogged Watch on Telephone Use", D. I. Stusser, pp. 59-62.
Telephone Engineer & Management, Nov. 1, 1985, "PBX adds efficiency in fast paced arena", vol. 89, No. 21, pp. 100-101.

Primary Examiner—Stafford D. Schreyer
Attorney, Agent, or Firm—Frederick B. Luludis

[57] ABSTRACT

A call charge allocation arrangement is implemented for a business communication system to track those situations in which a toll call is transferred from a first station to a second station. The arrangement tracks such transfers by establishing a first call record at the time the call is placed and establishing a second call record at the time the call is transferred, such that call charges which accrue prior to the transfer are entered in the first call record and call charges which accrue subsequent to the transfer are entered in the second call record.

7 Claims, 2 Drawing Sheets

FIG. 2

| AUG | AC | XUID | TFR | CNFC | ACC | OC | IC | FRL | ENDT | STT | DA | MO | YR | TND | UID | OTR | ITK | TGUID |
|---|---|---|---|---|---|---|---|---|---|---|---|---|---|---|---|---|---|---|

FIG. 3

| OTK | ITK | FRL | AUTHORIZATION CODE | ACCOUNT CODE | CALLING NUMBER | DIALED NUMBER | ACCESS CODE | CONDITION CODE | TIME |
|---|---|---|---|---|---|---|---|---|---|

FIG. 4

| CALL PROCESSING PROGRAM |
|---|
| T_MP |
| C_RP |
| C_TP |
| CALL RECORDS |

TELEPHONE CALL CHARGE ALLOCATION ARRANGEMENT

FIELD OF THE INVENTION

The invention relates to business communication systems and more particularly to a telephone call charge allocation arrangement for use in such systems.

BACKGROUND OF THE INVENTION

Business customer communication systems, such as a private branch exchange, typically employ the well-known station message detail recoding (SMDR) arrangement to track the telephone calling activity at system telephone stations. For example, each time a user at a system telephone station either places or receives an outside telephone call (for example, a toll call), the SMDR arrangement creates a call record detailing the event. Call records which are created over illustratively a 30 day period are processed to generate a "telephone bill" for each system telephone station.

However, such call records may be incorrect since prior SMDR arrangements do not accurately detail the events that occur when a toll call is transferred from the originating system station to another system station. In such an instance, prior SMDR arrangements would create a call record only for the originating station. Consequently, the originating station would be charged for the full duration of the call.

SUMMARY OF THE INVENTION

The call recording problem that arises when a toll call is transferred from a first system station to a second system station is obviated by, in accordance with the invention, establishing at the time of the transfer a call record for the second station so that the duration of the call can be accurately allocated between the first and second stations. Thus, my arrangement accurately tracks the events that occur whenever a toll call is transferred from one station to another station.

Specifically, my SMDR arrangement establishes a call record whenever a first system station either places or receives an outside call and establishes another call record if the call is transferred to a second system station, such that the identity of the second station is inserted in the call record established for the first station. Accordingly, the duration of the call is allocated between the first and second stations, rather than being charged to the first station. In addition, a call record is established if a system attendant (system telephone operator) is involved in either transferring an outside call from one system station to another system station.

BRIEF DESCRIPTION OF THE DRAWING

In the drawing;

FIG. 2 is an example of a call record;

FIG. 3 is a diagram of the format of a call record message that is outputted to a printer within the communication system of FIG. 1; and FIG. 4 is a layout of a portion of memory within the communication system of FIG. 1, the memory having a plurality of call records.

DETAILED DESCRIPTION

Figure 1:
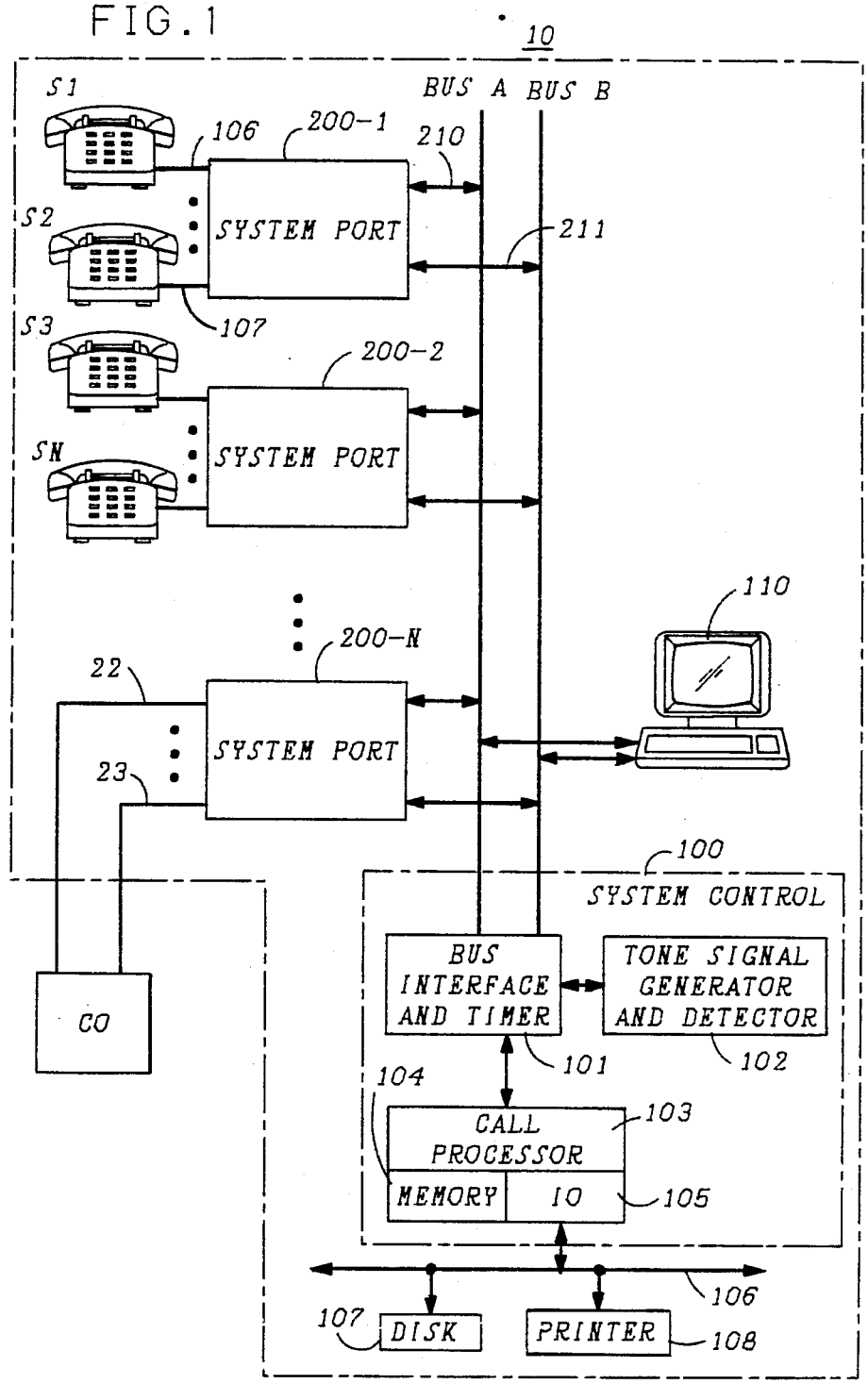
FIG. 1 is a broad block diagram of a business communication system in which the invention may be advantageously practiced.

FIG. 1 shows a block diagram of a business customer communication system 10 which combines the usual features with the present invention. Control is distributed among a plurality of system ports 200-1 through 200-N, with each system port, such as system port 200-1, serving a number of terminals, such as telephone station sets S1 and S2. A system port, such as port 200-N, may also serve a number of central office (CO) lines, such as CO lines 22 and 23. The system ports, in turn, are served by a digital bus system having time division multiplexed busses A and B and a common system control 100. Common system control 100 includes, inter alia, bus interface and timer 101, tone signal generator and detector 102, call processor 103, and I/O control 105. Call processor 103 operates to take in stimuli from the station sets and CO lines via their respective port circuits and to establish a connection between a station set and another station set or a CO line. System bus A and bus B are time division multiplexed busses, each having 256 times slots. I/O control 105 is used to interface call processor 103 with hard disk 107 and printer 108 via I/O bus 106. Interface 101 is used to interface processor 103 with system bus A and B. Tone signal generator detector 102 generates digital versions of the various call progress tones and digit tones that are used within the system of FIG. 1, such digit tones being converted to analog tones before they are supplied to a station set user or CO line. One such arrangement for generating and distributing such tones within a communication system of the type shown in FIG. 1 is disclosed in U.S. Pat. No. 4,535,454 issued Aug. 13, 1985 to C. A. Buzzard et al, which is hereby incorporated by reference.

Associated with call processor 103 is memory 104, which is used to store, inter alia, the program which directs the operation of the system. Memory 104 is also used to store records associated with respective stations. Stimuli, such as telephone digits and supervisory signals received from a station, such as, for example, station S1, are stored in the respective station record. The station record is used by processor 103, operating in conjunction with the stored program, to track the functional status of station S1 upon receiving a new stimuli therefrom.

A call connection between station sets or between a station set and a CO line, is established in the system by call processor 103 in response to receiving a stimuli from the station which originates the call, the stimuli being, for example, an off-hook signal.

Specifically, when a calling station goes off-hook, the system port serving that station notifies call processor 103. When the last of the digits of the telephone number being dialed by a user operating the calling station has been received, processor 103, under control of the aforementioned program stored in memory 104, establishes a connection between the calling station and called station by assigning a system bus time slot to each station. The addresses of the two time slots are supplied to the system port associated with each station. Thereafter, each system port transfers signals that it receives from its associated station to the system bus during the time slot assigned to the station and passes signals to its associated station that it receives from the system bus during the time slot assigned to the other station. The manner in which a telephone call connection, including a so-called conference connection, is established within system 10 and the manner in which a system port operates to control the movement of digital messages on and off the system bus is discussed in U.S. Pat. No. 4,389,720 issued June 21, 1983 to L. A. Baxter et al, which is hereby incorporated by reference.

If the telephone number that is dialed by a user at a station, such as station S1, happens to be an outside call, i.e., either a so-called local telephone call or a toll call that is to be established over one of the CO lines 22-23, then call processor 103 invokes a so-called trunk manager program (TM_P) that is stored in memory 104 to process the call. The trunk manager program, inter alia, (a) selects an idle outgoing trunk circuit connected to one of the CO lines, such as CO line 22, (b) causes the dialed digits to be outpulsed to the local central office (CO) 20 connected to the other end of line 22, and (c) assigns system bus time slots, as discussed above. The trunk manager program also passes the identity of the calling station (e.g., extension number), the called telephone number and identity of the selected trunk circuit to a call recording program (discussed below).

A call connection may also be established from local central office 20 (FIG. 1) to a station set within system 10. In this instance the local central office first seizes a port 200-N incoming trunk via one of the CO lines, such as line 23, and then passes the called telephone number one digit at a time to system 10, the called number being illustratively a telephone number assigned to a system 10 station. The port 200-N port controller collects the digits of the telephone number and passes them to call processor 103 via either system bus A or B. Processor 103 responsive to line 23 being seized by the local CO and receipt of the telephone digits invokes the trunk manager program to establish a connection between the port circuit 200-N serving line 23 and the station identified by the received telephone digits.

When the call is answered, the trunk manager program passes the identity of the trunk circuit connected to line 23 and the called number to the call recording program.

The call recording program (CR_P), which is also stored in memory 102, is arranged to perform the well-known SMDR function and establishes a detail call record for each incoming and outgoing call, i.e., those calls involving one of the CO lines 22-23. The information that the program stores in a call record includes, inter alia, (a) the identity of the trunk circuit that is involved in the call, (b) the starting and ending times of the call, (c) the identity of the calling station, and (d) the called telephone number, as will be discussed in detail below.

A feature of system 10 allows a station set user who has either placed or received an outside call involving one of the lines 22-23 to transfer the call to another system 10 station set.

Specifically, if a user at a station, for example, station S1, happens to be connected to an outside telephone line, for example, CO line 23, and if the user desires to transfer the call to another station within system 10, such as station S3, the user may do so by operating illustratively a transfer button located on station S1 and then dialing the extension number assigned to station S3. Call processor 103 responsive to receipt of a transfer signal and station S3 telephone extension number from station S1 invokes a call transfer program (CT_P). The call transfer program, in turn, "breaks down" the connection between station S1 and line 23 and establishes a connection between station S3 and line 23.

In prior call recording arrangements, the fact that either an incoming or outgoing call is transferred from one station to another station, such as a call from station S1 to station S3, is lost, since such prior arrangements charge the originating station for the full duration of the call regardless of whether or not the call is transferred to another station. My invention, on the other hand, tracks such transfers. For example, if a user at a station places an outside call and then later transfers the call to another station, a call record is established detailing the orignal call and, in accordance with the invention, a call record is established detailing the transfer, in which the first call record points to the second call record by identifying the station to which the call was transferred. Thus, the duration of such a call is allocated among the stations that are involved in the call, rather than just the originating station, as is done in prior arrangements.

In particular, when the transfer program completes a transfer of a call from one station to another station, such as the call transferred from station S1 to station S3 discussed above, it notifies the call recording program of that fact. The call recording program responsive thereto inserts (a) a termination time, (b) the identity of station S3 and (c) the fact that the call was transferred to station S3 in the call record established for station S1. The call recording program, in accordance with the invention, also establishes a new call record for station S3 so that the duration of the call can be properly allocated between stations S1 and S3.

Since the attendant console 110 (FIG. 1) is, in essence, another station within system 10, a call record is established for console 110 whenever the attendant thereat places an outgoing call. Also, in those instances in which a user at a station, for example, station S2, transfers an outside call to another station, for example, station S3, via console 110, a call record is established showing the call transferred to console 110 and a call record is also established for station S3 when the attendant transfers the call to that station. Thus, in accordance with the invention, the duration of an outside call is allocated among the system 10 stations connected to the call as long as the call is a so-called two-party call, as discussed below.

For example, if station S3 happens to be connected to an outside call via one of the CO lines 22-23 and the user at station S3 then directs system 10 to establish a conference connection to include, for example, stations S1 and S2, in the call, the call recording program will update the call record that was established for station S3 to show that the call involved a conference connection. In this instance, the call recording program does not establish call records for stations S1 and S2 when they join the connection, but charges the full duration of the call to the station S3 call record even if the user at station S3 leaves the conference connection before it is terminated. However, if thereafter another station, for example, station S1, also disconnects from the conference connection leaving just station S2 connected to the outside line, then, in that instance, the call recording program, in accordance with an aspect of the invention, will establish a call record for station S2 so that the duration of the call can be allocated between stations S2 and S3.

Turning now to FIG. 2, there is shown an example of a call record and the various fields within the record that are "filled in" by the call recording program. A portion of memory 104 (FIG. 1) is reserved for a number of such records—illustratively 256 call records, one for each system bus time slot. The one-to-one association between the call records and system time slots allows the call recording program to associate a respective call record with a system station connected to an outside line based on the system bus time slot that is assigned to the station. The call recording program establishes an accurate record of an outside toll call by inserting details associated with the call into respective fields of the call record.

In particular, the TGUID and ITK (OTK) fields are used to identify the trunk group and incoming (outgoing) trunk, respectively, that is involved in the call. The UID field is used to identify the system 10 station, such as station S1, that is involved in the call. The called telephone number is inserted in the TND field when the call involves an outgoing trunk.

The YR, MO, AND DA fields are used to identify the date of the call and the STT and ENDT fields are used to identify the starting and ending times of the call, respectively. The facility restriction level of the station identified by the UID filed is entered in the FRL field. THe fields IC or OC are used to identify whether the call involves either an incoming or outgoing line, respectively. The ACC field is reserved for an account code if a user of system 10 dials such a code when placing an outgoing call.

THe CNFC field is "filled" in when a conference call established by system 10 involves either an incoming or outgoing line, as discussed above. The TFR field is filled in when the station identified by the UID field transfers an outside call to another station within system 10, as discussed above. The telephone extension of the station to which the call is transferred is entered in the XUID field. If the user dials an access code, such as an 8 or 9, to access, for example, a tie line or a system 10 feature, such as the well-known automatic-route-selection feature, then the code is entered in the AC field. If the user dials an authorization code, then it is entered in the AUC field.

When a call record is completed, i.e., the ending time of the respective call has been entered in the ENDT field, the call recording program passes the respective call record to an I/O processor for storage on, for example, a disk 107 (FIG. 1). The program also outputs an abbreviated form of the record to a printer 108 (FIG. 1) in the format shown in FIG. 3.

FIG. 4 illustrates a layout of the (a) call processing program which directs the operation of system 10, (b) trunk manager program T_MP, (c) call recording program C_RP, (c) call transfer program C_TP, and (d) call records of FIG. 2, in memory 104 (FIG. 1).

The foregoing is merely illustrative of the principles of my invention. Those skilled in the art will be able to devise numerous arrangements which, although not explicitly shown or described herein, embody those principles that are within its spirit and scope.

What is claimed is:

1. A telephone call recording arrangement for use in a communication system having a plurality of telephone stations and outside telephone lines connected thereto, said communication system being operative for establishing a connection between one of said stations and one of said telephone lines, said arrangement comprising
memory means having a plurality of memory locations for the storage of telephone call records detailing respective connections between individual ones of said telephone stations and individual ones of said outside telephone lines,
means responsive to a request from said one station for transferring said connection from said one station to another one of said plurality of stations, and
means responsive to the transfer of said connection for establishing in said memory a call record for said other station, for entering in said other station call record call charges occurring subsequent to said transfer and for entering in a call record priorly established in said memory for said one station call charges occurring prior to said transfer.

2. A call recording arrangement for use in a business communication system having a plurality of stations and outside telephone lines connected thereto comprising
a memory having a plurality of memory locations for the storage of call records,
means responsive to a request received from either one of said plurality of station sets or one of said telephone lines for establishing a telephone call connection between said one station and said one telephone line,
means responsive to a call transfer request from said one station for transferring said telephone call connection from said one station to another one of said plurality of stations, and
means responsive to said transfer of said call connection for establishing in said memory a call record associated with said other station, for entering in that call record at least the identity of said one telephone line and the time of said transfer and for entering in a call record priorly established in said memory for said one station at least the identity of said other station.

3. The arrangement set forth in claim 2 wherein said other station is an attendant console.

4. The arrangement set forth in claim 2 wherein the time of said transfer is entered in the call record established for said one station as a call connection end time and in the call record established for said other station as a call connection start time.

5. A call recording arrangement for use in a business communication system having a plurality of stations and telephone lines connected thereto comprising
memory means having a plurality of memory locations for the storage of call records, said call records being used to identify respective call connections between individual ones of said plurality of stations and individual ones of said plurality of outside telephone lines,
means responsive to a request from either one of said plurality of stations or one of said plurality of telephone lines for establishing a connection between said one station and said one telephone line,
means thereafter responsive to receipt of a call transfer indication and the identity of another one of said stations from said one station for transferring said call connection from said one station to said other station, and
means responsive to said transfer for entering in a call record associated with said one station at least the identity of said other station and the time that said transfer occurred and for entering in a call record associated with said other station at least the time of said transfer.

6. The arrangement set forth in claim 5 wherein the identity of said one telephone line is entered in the call records associated with said one and other one of said stations, respectively, and wherein the time that said transfer occurred is entered in the call record associated with said one station as a call connection end time.

7. A call charge allocation arrangement for use in a communication system having a plurality of station sets and central office telephone lines connected thereto comprising memory means having a plurality of memory locations, a group of said memory locations being used for the storage of call records, means responsive to a request from either a first one of said plurality of stations or one of said telephone lines for establishing a connection between said first station and said one telephone line, means responsive to a subsequent request from said first station for adding at least a second one of said plurality of stations to said connection, and means thereafter responsive to said first station disconnecting from said connection for establishing in said memory a call record associated with said second station, for entering in that record call charges occurring subsequent to said disconnection and for entering in a call record priorly established for said first station call charges that occurred prior to said disconnection, whereby the full duration of said connection to said one telephone line may be allocated between said first and second stations based on the call records established for said first and second stations.

* * * * *